3,294,849
PRODUCTION OF ALKYNOLS AND ALKYNEDIOLS USING CONTINUOUS PHASE SILICA GEL CARRIER IMPREGNATED WITH 15 TO 20 PERCENT COPPER AND 2 TO 9 PERCENT BISMUTH
Otto F. Hecht, deceased, late of Easton, Pa., by Friedel Elizabeth Hecht, administratrix, Easton, Pa., and Max E. Chiddix, Easton, Pa.; said Chiddix assignor to General Aniline & Film Corporation, New York, N.Y., a corporation of Delaware
No Drawing. Filed Apr. 15, 1965, Ser. No. 449,390
3 Claims. (Cl. 260—635)

This application is a continuation-in-part of our application Serial No. 64,722, filed October 25, 1960, now abandoned.

This invention relates to an improved catalyst for use in the production of alkylnols and alkynediols by the reaction of aldehydes or ketones with an acetylenic hydrocarbon containing an active hydrogen.

It is known that aldehydes and ketones can be reacted in the liquid phase with acetylene hydrocarbons corresponding to the general formula

R—C≡CH wherein R stands for a member of the group consisting of hydrogen and hydrocarbon radicals in the presence of an acetylide of a metal selected from the class consisting of the metals of group Ib of the periodic system and mercury. In large scale operations of this process it has been found that copper acetylide is the preferred catalyst. However, the copper acetyide loses its activity in use and side reactions occur which decrease the yield of alkylnols and alkylnediols.

To overcome the forthcoming shortcoming, it was suggested in U.S. Patent 2,300,969 to prolong the activity of the copper catalyst by incorporating therein substances capable of preventing cuprene formation. In actual practice, it has been found that this useful effect lasts long when the catalyst contains no elementary copper formed by the slow decomposition of copper acetylide. The presence of bismuth oxide, bismuth oxyiodide or cerium oxide in the catalyst slows down the formation of metallic copper from the acetylide.

Various improvements in this type of catalyst have been described by different investigators. In U.S. Patent 2,768,215 to Otto F. Hecht, there is described the preparation of catalysts for the production of alkynols and alkynediols by the reaction of acetylene or acetylene hydrocarbons with carbonyl compounds by depositing copper oxide and bismuth oxide on a siliceous carrier and heating the thus impregnated siliceous carrier to a temperature within the range of 400° to 800° C. for a period of time ranging from 15 to 100 hours. The catalyst as described contains 11.6% copper and 6.4% bismuth, and was shown to have long catalyst life.

In U.S. Patent 2,871,273 to Behn, there is described a special catalyst for the production of alkynols and alkynediols which is based on a magnesium silicate support. Good activity and catalyst life are described for this catalyst which may contain from 8 to 15% copper and 2 to 3% bismuth.

All the catalysts described in the foregoing patent art have a copper content no higher than 15% and generally around 12%. This has apparently been due to the fact that copper tends to be displaced from these carriers during the ethynylation process and to be precipitated at certain points in the lines as explosive copper acetylide. This tendency is stronger as the copper content is increased. These catalysts are prepared from a powdered siliceous material which is extruded with a binder and roasted for strength.

In U.S. Patent 2,939,844 to Ellinger there is described a catalyst based on copper silicate which may contain from 15 to 60% copper. However, since the copper silicate is used as the carrier in place of a siliceous material, not all this copper is available to form the catalytic copper acetylide. It is apparent that only the copper and bismuth applied to the surface of the copper silicate powder are able to perform the catalytic function.

During the course of our experimentation with various types of catalysts, we have observed that with a special type of carrier it is possible to use a higher copper content and at the same time to utilize most of the catalytic activity of this increased amount of copper. The catalyst thus formed has an unusually high activity and also good stability and life. In addition, the copper is tightly bound with the result that no dangerous copper acetylides are deposited in the equipment when the catalyst is used for ethynylation.

Accordingly, the principal object of the present invention is to provide a catalyst of 15 to 20% Cu content which prevents the release of free cuprous acetylide to the reaction mixture without the danger of an explosion in the reaction system and is ideally suited for the preparation of alkylnols and alkynediols by the reaction of aldehydes or ketones with an acetylenic hydrocarbon of the aforeshown formula.

Other objects and advantages will become more clearly manifest from the following description:

We have discovered that by employing a continuous phase silica gel as carrier, catalysts of 15% to 20% Cu and 2% to 9% bismuth can be readily prepared which will have all of the foregoing advantageous and desirable features. The continuous phase silica gels are readily available on the commercial market in a sieve size of 6 to 10 mesh and also in smaller mesh sizes. The best of such commercially available gels are these sold under the brand name of "Davison I.D. Gel" which, according to our findings, can take up to 20% Cu. Moreover, such continuous phase silica gel carriers are completely different from the extruded silica gel carriers, as described in U.S. Department of Commerce Publication Board Report No. 28556 (Appleyard and Gartshore), and U.S. Department of Commerce Publication Board Report No. 80,334 (Fuller, Zoss and Weir, pages 9 to 11), because they are capable of absorbing more Cu and Bi in the form of their nitrates or acetates, yielding after firing firmly anchored CuO and $Bi_2O_3$ throughout the continuous phase silica gel. After impregnation, the excess volatiles are removed by any means supplying a continuous current of air or nitrogen stream over the carrier soaked in excess impregnation liquid and heated by steam. A suitable apparatus of this type consists of a rotating spherical or cylindrical container, made from stoneware, stainless steel or glass or other acid resistant material, e.g., Teflon-lined common steel. A shaft is attached to one side of the container to provide rotation by means of a motor, e.g., an air-driven motor or electromotor. The container is also provided on the other side with an inlet for air or an inert gas and an outlet for the volatiles, to be removed by introducing preheated air or inert gas into the inlet. These volatiles may be liquefied by means of an attached cooled condenser and receiver.

The resulting fully impregnated gel, which is dry looking, is now dried for 45 minutes to one and one-half hours at 150° C. followed by the actual firing (decomposition of the nitrates or acetates or both to form copper and bismuth oxides) at a temperature of 450° C. up to 700° C., but not over 720° C., for a time ranging between 3 to 10 hours. It was also discovered that when utilizing the continuous phase silica gel, the extended heat treatment described in U.S. Patent 2,768,215 is not necessary for good catalyst life. This affords a great saving in firing time and makes the catalyst much lower in cost.

In order to determine the effect of the new catalyst with the higher content of catalytically active copper, the following comparisons were made. Using the method described in Example 1, two catalysts were prepared from the continuous phase silica gel, one with 18.0% copper (Catalyst A) and the other with 11.5% copper (Catalyst B). In addition, the catalyst described by Behn was prepared from magnesium silicate (Merck) with a copper content of 16.0% (Catalyst C). The catalyst described by Ellinger was prepared (Catalyst D) It had a copper content of 31.5%. These four catalysts were activated at 70° C. as described in Example 1. These catalysts were each then used for the reaction of 20% formaldehyde with acetylene as described in Example 1. Each was used in a 12-hour reaction at 100° C., and then in a second similar reaction at 110° C. The results of these experiments are summarized in Table I.

It is apparent from Table I that Catalyst A is superior to the others in reaction rate giving a higher conversion of formaldehyde to butynediol and propynol In addition, almost no side reactions are observed with this catalyst since the formaldehyde is converted almost entirely to the desired products. It is seen that with the same carrier, the use of a lower copper content (Catalyst B), as taught in the prior art, produced a catalyst of much lower activity and one which when used at 110° C. to increase its activity leads to side reactions as evidenced by loss of formaldehyde. The magnesium silicate catalyst prepared according to the disclosure of Behn not only shows low activity but also a high loss of formaldehyde giving very poor yields of butynediol.

Catalyst D, the copper silicate catalyst prepared according to Ellinger, gave a good conversion at 100° C., but the copper content of the reaction solution was 21 p.p.m., a dangerous level for the precipitation of explosive copper acetylides in a plant operation. In addition, the product solution was orange in color instead of light yellow, indicating a tendency to side reactions. This tendency was much more pronounced in the experiment at 110° C. with this catalyst. In this case, although all of the formaldehyde was consumed, 28% of it was lost in side reactions and only 65% was converted to butynediol in the case of Catalyst A. The product obtained with Catalyst D at 110° C. was a black solution which smelled strongly of burnt sugar. This also indicates the conversion of formaldehyde to polyol aldehydes which decomposed further. It is apparent that Catalyst D is very unsuitable for use in a commercial reactor where it may be desirable to operate at 110° C. in order to increase the output and lower the cost. It is also unsuitable from the standpoint that temperature control is difficult in a fixed bed reactor and slight overheating would with this catalyst result in extensive product degradation.

The details of preparing the new and improved catalyst in accordance with the present invention will be apparent from a consideration of the following examples. The parts given are all by weight.

EXAMPLE I

*Preparation of catalyst*

339 parts of a continuous phase silica gel (on 10 mesh U.S. Standard sieve) grade 70 are impregnated with 920 parts of a solution consisting of the following components:

| | Parts by weight |
|---|---|
| Cupric nitrate trihydrate | 870 |
| Bismuth nitrate pentahydrate | 90 |

The above two salts were dissolved in a mixture of

| | |
|---|---|
| Nitric acid C.P. 70% | 804 |
| and | |
| Water | 772 |

The impregnation is conducted in a container for 5,000 parts by volume, consisting of a round glass flask with a 1 neck opening provided with an air inlet and air outlet to permit a regular stream of cool or hot air to pass through. The exterior bottom of the flask is provided with a cylindrical solid rod and made adaptable for rotation by means of a small fan belt motor. The volatiles, i.e., nitric acid in water, are carried with the air stream through a water-cooled condenser to an ice-cooled receiver, where they are measured. Both the condenser and receiver are connected loosely through the opening of the round flask. In about 10 minutes, after the gel and the impregnation liquid are mixed in the rotating container, the steam bath is brought to 95° C.–100° C. with low pressure steam and air blown in a regular stream over the rotating mixture of impregnated gel and impregnation liquid. In this connection, it might be mentioned that instead of air there may be used nitrogen or carbon dioxide. In about 1½ to 1¾ hours at 90° to 95° C. (inside temperature), approximately 340 to 354 parts of volatiles distills off (diluted nitric acid) and there remains 905 to 916 parts of dry blue colored gel. The gel is then dried for 1 hour at 150° C. in an electric oven followed by firing for 2½ hours at 500° C. and for an additional 2½ hours at 650° C. The yield obtained amounts to from 450 to 453 parts of a finished catalyst of deep black color. Analysis shows that 97% of this catalyst is on 10-mesh U.S. Standard sieve with a Cu content of 18.1% and a Bi content of 3.1%, while the 3% fines showed 19.4% Cu and 2.9% Bi.

Forty parts of the foregoing dry catalyst was placed in a stainless steel wire basket which was attached to the stirring shaft of a 1-liter autoclave. The autoclave was charged with 500 parts of ten percent formaldehyde buffered to a pH of 4.6 with 3.7 parts of sodium acetate

TABLE I.—COMPARISON OF COPPER CATALYSTS FOR ETHYNYLATION

[Reaction time: 12 hours]

| Catalyst | Run No.[1] | Temp., °C. | Percent Formaldehyde Consumption | Percent Conversion of $CH_2O$ to | | Percent Loss of $CH_2O$ [2] |
|---|---|---|---|---|---|---|
| | | | | Butynediol | Propynol | |
| A. Silica Gel Base [3] 18.0% Cu, 6.3% Bi | 1 | 100 | 98.7 | 95.3 | 0.6 | 2.8 |
| | 2 | 110 | 99.3 | 91.1 | 7.4 | 0.8 |
| B. Silica Gel Base [4] 11.5% Cu, 2.5% Bi | 1 | 100 | 66.6 | 66.6 | 3.0 | 0 |
| | 2 | 110 | 95.6 | 80.7 | 0.4 | 14.5 |
| C. Magnesium Silicate Base [5] 16.0% Cu | 1 | 100 | 55.3 | 39.0 | 0 | 16.3 |
| | 2 | 110 | 81.7 | 39.7 | 0.6 | 41.4 |
| D. Copper Silicate [6] 31.5% Cu | 1 | 100 | 97.0 | 93.4 | 10.8 | 0 |
| | 2 | 110 | 99.4 | 64.7 | 6.6 | 28.1 |

[1] Two ethynylation runs were made with each catalyst, one at 100° C. and one at 110° C.
[2] Loss of formaldehyde in side reactions.
[3] Catalyst prepared by method of Example 1.
[4] Catalyst prepared with same continuous phase silica gel base as used in Example 1, but with the lower copper content recommended in the prior art.
[5] Catalyst prepared by the method of Behn (U.S. 2,871,273) using magnesium silicate obtained from Merck.
[6] Catalyst prepared by method of Example 1 of Ellinger (U.S. 2,939,844). Analysis showed 31.5% copper.

and 2.7 parts of acetic acid. The air was displaced with nitrogen and then a nitrogen-acetylene mixture was added such that at 70° C., the total pressure was 200 p.s.i.g. and the acetylene content was 55%. The catalyst container was rotated in the formaldehyde solution for 12 hours at 70° C. with additional acetylene added as necessary to maintain the pressure at 200 p.s.i.g. The autoclave was allowed to cool and the formaldehyde solution discharged. This completed the activation of the catalyst which showed by analysis a copper acetylide content of 15% (theory: 21.5% of $Cu_2C_2$).

The activated catalyst in the wire basket was replaced in the autoclave together with 500 parts of 20% aqueous formaldehyde buffered at a pH of 4.6 as above. Acetylene and nitrogen were added as before to a total gauge pressure of 200 p.s.i. when the reaction temperature of 100° C. was reached. The catalyst container was rotated in the formaldehyde 12 hours at 100° C. with samples removed at intervals. After 4 hours, 39% of the formaldehyde had reacted; after 6 hours, 62%; and after 12 hours, 98%. There was obtained a reaction mixture containing 126 parts of butynediol, 12 parts of propynol, and 2 parts of formaldehyde. This corresponds to 91% conversion of charged formaldehyde to 2-butyne-1,4-diol and a 6.6% conversion of formaldehyde to propynol. The pH of the reaction mixture was 4.5. The catalyst was reused and furnished in four similar runs, an average conversion of 95% of the charged formaldehyde.

EXAMPLE II

Example I was again repeated with the exception that the impregnation solution was replaced by the following:

200 parts of a continuous phase silica gel (on 6 mesh U.S. Standard sieve) were impregnated with 544 parts of a solution consisting of the following components:

| | Parts by weight |
|---|---|
| Cupric nitrate dihydrate | 483 |
| Bismuth nitrate pentahydrate | 45 |
| These two salts were dissolved in a mixture of nitric acid C.P. 70% | 402 |
| and | |
| Water | 386 |

The impregnation was performed in a container for 2000 parts by volume in exactly the same way as described in Example I. After removal of the volatiles, 534 parts of visibly dry, blue-colored gel were obtained.

The impregnated gel was then dried for 1 hour at 150° C. in an electric oven, followed by firing for 2½ hours at 500° C. and for an additional 2½ hours at 600° C. The yield obtained amounted to 268 parts of a finished catalyst of deep black color.

The analysis showed that 94.8% of this catalyst was on 10 mesh U.S. Standard sieve with a Cu content of 19.2% Cu and 2.73% Bi.

The foregoing catalyst was activated at 70° C. with 10% formaldehyde solution at a pH varying from 4.6 to 4.3 with a nitrogen-acetylene mixture at 200 p.s.i.g. total pressure (containing calculated 55% acetylene) for a period of 12 hours. Thereafter the catalyst is ready for alkynol and alkynediol synthesis with a cuprous acetylide content up to 17% (theory: 22.8% of $Cu_2C_2$). This catalyst furnished, when run in an autoclave for reaction with 20% formaldehyde at a pH of 4.6 and at 100° C. under a total pressure of 200 p.s.i.g., conversions of formaldehyde to butynediol and propynol of from 92% to 98% over a series of six consecutive runs.

From the foregoing examples it is clearly evident that the catalysts prepared in accordance with the present invention make it possible to produce butynediol very rapidly at moderate reaction temperatures, thereby minimizing side reactions. Accordingly, the novel feature of the present invention is a new type of catalyst which is readily employed in the reaction of acetylenic hydrocarbons with carbonyl compounds i.e., aldehydes and ketones, in accordance with the processes described in United States Patents 2,232,867; 2,768,215; 2,300,969 and 2,871,273, the disclosures of which are incorporated by reference thereto with regard to examples of various aldehydes, ketones, acetylenic hydrocarbons, temperature and pressure ranges of the reaction as well as the ratio of reactants. The acetylenic hydrocarbons disclosed in said patents, especially 2,232,867, include acetylene itself, methylacetylene, vinylacetylene and phenyl acetylene. The aldehydes include formaldehyde, acetaldehyde, butyraldehyde, crotonaldehyde, dodecylaldehyde and oenanthaldehyde. The ketones include acetone and methyl ethyl ketone.

EXAMPLE III

A catalyst was prepared by the impregnation of continuous phase silica gel (on 10 mesh U.S. Standard sieve) with a solution of cupric nitrate trihydrate and bismuth nitrate pentahydrate in 31.7% nitric acid as described in Example I. However, a double calcining procedure of five hours at 500° C. and five hours at 650° C. has been performed.

This catalyst consisted of 91.3% of particles on a 20 mesh sieve, having a 16.3% Cu and 2.9% Bi, while 6.9% fines went through the 10 mesh sieve with a Cu-content of 13.9 and a Bi-assay of 3.2%.

This catalyst has been activated in the manner described in Examples I and II and showed after the activation with acetylene at 70° C. a $Cu_2C_2$ content of 9.6% and in later runs up to 15% $Cu_2C_2$ (theory: 19.4% $Cu_2C_2$). This catalyst gave a conversion of 88% of the formaldehyde to butynediol and propynol in 12 hours at 100° C. when used in the process described in Example I. No side reactions of formaldehyde took place, and the product after dehydration consisted of 96% of butynediol and 4% propargyl alcohol. The catalyst was still good after a total of eight similar runs.

EXAMPLE IV 361 parts of continuous phase silica gel (on 10 mesh U.S. Standard sieve) is impregnated with:

696 parts of an impregnation solution, which has been prepared in the following manner:

370 parts cupric nitrate trihydrate and
46.5 parts bismuth nitrate pentahydrate are dissolved in 316 parts nitric acid 36.8%.

The impregnation and the evaporation of the volatiles at 90° C. to 95° C. was performed in exactly the same manner as described in Example I.

In about 40 minutes at 90° C. to 95° C. about 145 parts of volatiles have been distilled off and there remained 938 to 957 parts of dry, blue colored gel.

This material was dried for 1 hour at 150° C., followed by firing for about 2½ hours at 500° C. and 2½ hours at 600° C.

There was obtained about 465 to 470 parts of finished catalyst of a deep black color.

The analysis showed that 98% of this catalyst was on 10-mesh with a metal content of 15.0% Cu and 2.8% Bi, while the 2% fines showed 10.0% Cu and 2.0% Bi.

This catalyst furnished after activation with acetylene, as described in Examples I and II, a $Cu_2C_2$ content of 13.5% to 14% (theoretical value: 17.8%).

This catalyst furnished, when run in an autoclave for reaction with formaldehyde at a pH of 4.6, temperature of 100° C. and 200 p.s.i.g. total pressure after 12 hours, about 85% to 87% formaldehyde-conversion. No side-reactions of the formaldehyde took place and about 96% of the obtained reaction product is butynediol, while about 4% is propynol.

The catalyst was still good after eight runs.

We claim:
1. In the process of preparing alkynols by causing a carbonyl compound selected from the class consisting of aliphatic hydrocarbon aldehydes and aliphatic hydrocarbon ketones to react in the liquid phase with an acetylent hydrocarbon corresponding to the formula $$R—C≡CH$$

wherein R represents a member selected from the class consisting of hydrogen and aliphatic hydrocarbon radicals in the presence of a catalyst, the improvement which comprises employing as such catalyst a catalyst obtained by impregnating a continuous phase silica gel carrier with an aqueous nitric acid solution of copper nitrate and bismuth nitrate, volatilizing the water and nitric acid followed by heating within the range of 450° to 720° C. for a period of time ranging from 2 to 10 hours to decompose the copper and bismuth nitrates to the oxides, whereby the said carrier contains from 15% to 20% of copper and from 2% to 9% of bismuth.

2. In the process of preparing alkynols according to claim 1, wherein the said carrier contains from about 18% to 20% of copper and from 2.5% to 3.5% of bismuth.

3. In the process of preparing butynediol by causing formaldehyde to react in the liquid phase with acetylene in the presence of a catalyst the improvement which comprises employing such catalyst obtained by impregnating a continuous phase silica gel carrier with an aqueous nitric acid solution of copper nitrate and bismuth nitrate, volatilizing the water and nitric acid, followed by heating within the range of 450 to 720° C. for a period of time within 2 to 10 hours to decompose the copper and bismuth nitrates to the oxides, whereby the said carrier contains from 15 to 20% of copper and from 2 to 9% of bismuth.

References Cited by the Examiner

UNITED STATES PATENTS

| 1,933,091 | 10/1933 | Bertsch | 252—456 |
| 2,191,980 | 2/1940 | DeJahn | 252—456 |
| 2,300,969 | 11/1942 | Reppe et al. | 260—635 |
| 2,768,215 | 10/1956 | Hecht | 260—638 |
| 2,871,273 | 1/1959 | Behn | 260—635 |

FOREIGN PATENTS 784,638  10/1957  Great Britain.

BERNARD HELFIN, *Primary Examiner.*

LEON ZITVER, *Examiner.*

J. E. EVANS, *Assistant Examiner.*